United States Patent [19]

Thompson

[11] Patent Number: 4,830,710
[45] Date of Patent: May 16, 1989

[54] APPARATUS FOR RECYCLING SOLVENTS

[76] Inventor: Ronald D. Thompson, 6133 S. Utica, Tulsa, Okla. 74136

[21] Appl. No.: 100,575

[22] Filed: Sep. 24, 1987

[51] Int. Cl.$^4$ .............................................. B01D 3/02
[52] U.S. Cl. ................... 202/170; 202/176; 202/235; 203/49; 203/4; 203/100; 203/DIG. 25; 159/DIG. 32; 134/12; 126/360 R
[58] Field of Search ............ 202/176, 170, 235; 134/12; 203/49, 4, 100, DIG. 25; 159/DIG. 32; 126/360 R

[56] References Cited

U.S. PATENT DOCUMENTS

| | | | |
|---|---|---|---|
| 552,003 | 12/1895 | Riley | 202/170 |
| 4,536,256 | 8/1985 | Pastor | 202/164 |
| 4,693,786 | 9/1987 | Brett et al. | 203/100 X |

Primary Examiner—David L. Lacey
Assistant Examiner—Thi Dang
Attorney, Agent, or Firm—Head & Johnson

[57] ABSTRACT

A portable apparatus for on-site clean-up of dirty solvents. An open top liner for receiving dirty solvent is provided in a still housing. A head sits down over the top of the liner to form an enclosed space. Hot heating oil is provided beneath the liner and in the annular space between the liner and the housing. Dirty solvent is placed in the liner and is heated. The solvent vapors are fed to condensation coils for recovery. The heating oil is next removed and then the cap or head is removed and the contaminants are removed from the liner.

2 Claims, 3 Drawing Sheets

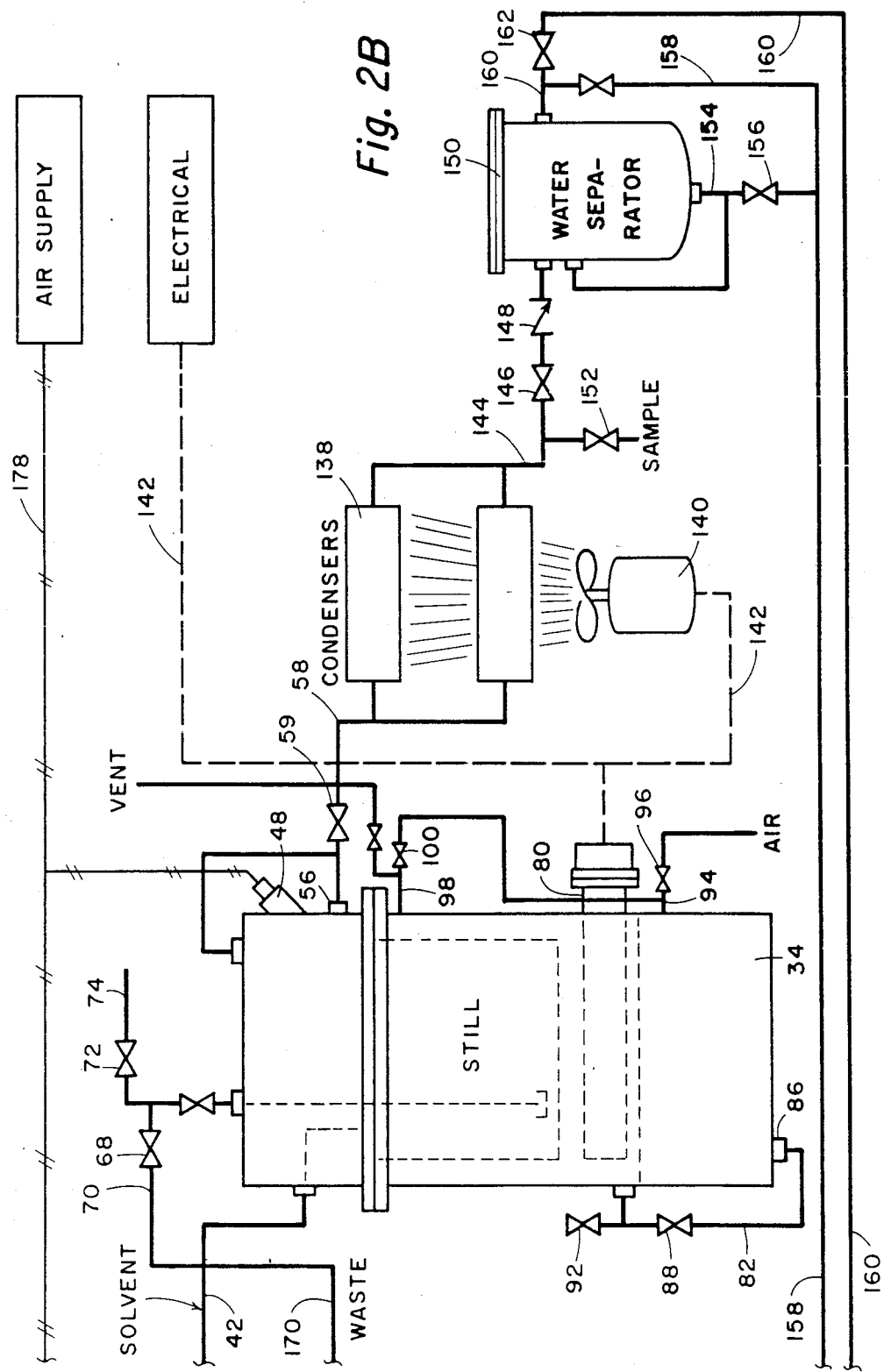

APPARATUS FOR RECYCLING SOLVENTS

FIELD OF THE INVENTION

This invention relates to improvements in the recovery of clean solvent from dirty solvent. The use of cleaning solvents in industry is quite wide in the U.S. The solvents are used to remove dirt or undesirable material from wide range of articles ranging from clothing to intricate automobile parts. These solvents become contaminated. Then one has to either throw the contaminated solvents away or else clean them. It is normally preferred to recover clean solvent from the contaminated solvent. One way of cleaning the dirty solvent is by heating the contaminated solvent to drive off the solvent as a vapor, collect the vapor, and run it through a condenser. The waste material can be disposed of and the clean solvent reused.

In the prior apparatus for cleaning the dirty solvent there is quite a problem of removing the sludge from the interior of a fixed structure. U.S. Pat. No. 4,536,256 suggested placing a bag in a bag holder to receive dirty solvent directly into the tank.

SUMMARY OF THE INVENTION

The present invention is directed to an improved solvent recovery apparatus. A cylindrical still housing having an open top is provided with an outwardly extending annular flange. An open topped cylindrical liner having a closed bottom is provided inside the still housing. As the liner is of a smaller diameter than the still housing there is an annular space between the liner and the still housing. The top of the liner has an outwardly extending annular flange which extends over the annular flange of the still housing.

A head or cap which in effect is a top closed cylinder with open bottom has a flange which fits over the flange of the liner to effectively seal the overall container. Dirty solvent is fed in through a conduit in the wall of the head and a level control is supported by the head and functions to stop the flow of solvent when it reaches a predetermined level in the liner. A heating oil is provided in the still housing in the spaced exterior of the liner. Means are provided to heat this heating oil. A vapor outlet is provided in the head to permit the vapors of the solvent to be removed and conducted to a condenser where they are condensed. They are then available for reuse.

A vertical waste pipe is connected through a coupling in the head and extends down to within about one-half inch of the bottom of the liner. After essentially all the solvent is vaporized and recovered, air under pressure is used to force the contaminants in the bottom of the liner out the waste pipe.

Means are also provided for a heating oil reservoir in the bottom of the still housing. After the solvent vapors have all been essentially driven off, the pressure is released in the liner and head, the heating oil is then removed from the heating oil zone and the head removed. At this time shovels can be used to remove the contaminant in the bottom of the liner. After the liner is cleaned up the head is put on and more dirty solvents put into the liner and the process repeated. In this way the solvent is cleaned on location and the dirty solvents are placed in containers on site and can later be properly disposed of.

It is therefore an object of this invention to provide an apparatus whereby clean solvent may be recovered from dirty solvent and the contaminant removed.

DESCRIPTION OF THE DRAWINGS

FIGS. 2A and 2B show a flow diagram incorporating the improved still shown in FIG. 1.

DESCRIPTION OF THE PREFERRED EMBODIMENT

Figure 1:
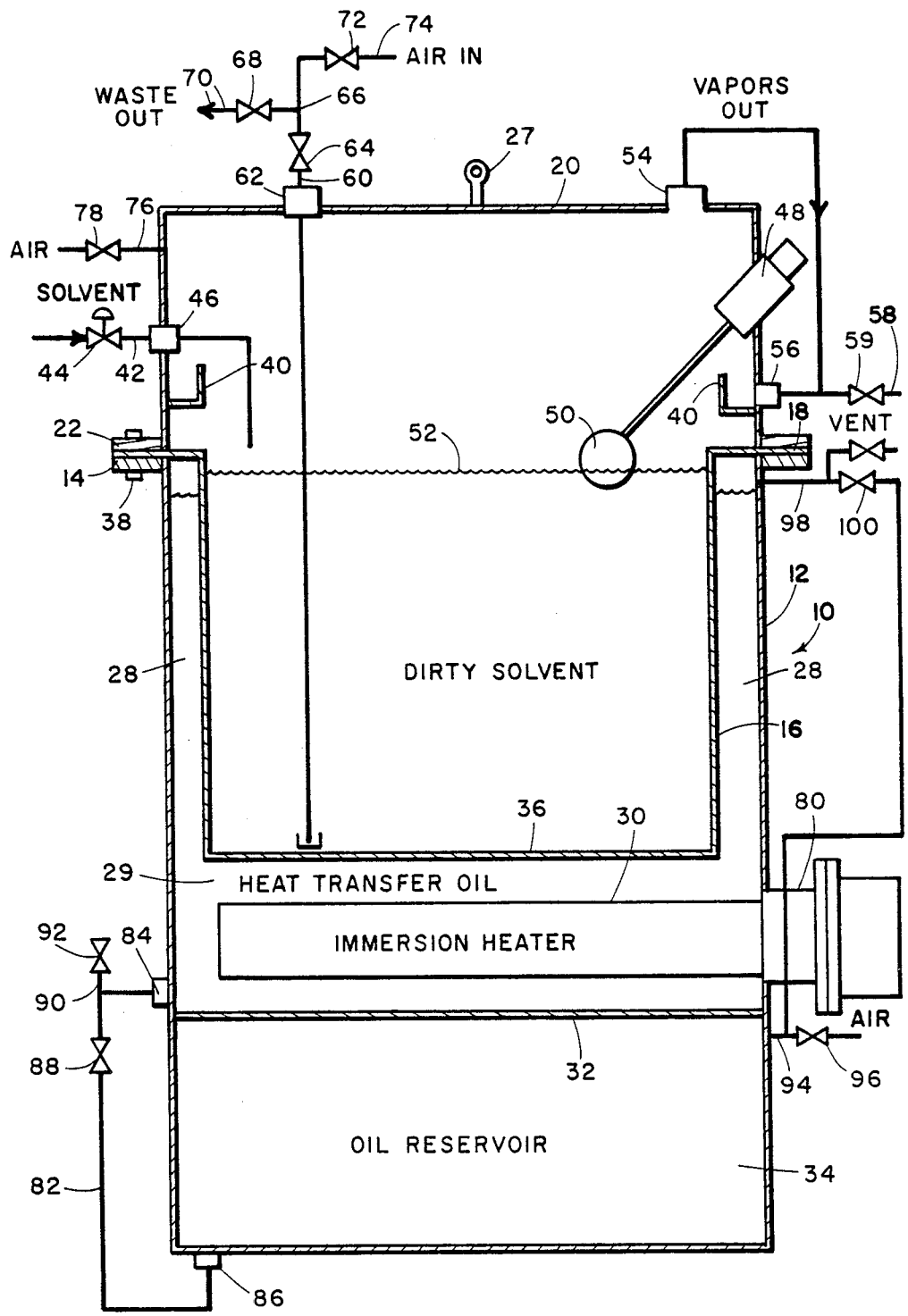
FIG. 1 is an elevational view partly in section which shows an improved still for use in removing contaminants from dirty solvent.

Attention is now directed to FIG. 1 which shows my improved still for recovering clean solvent from dirty solvent. Shown thereon generally is the still 10 having a still housing 12 which is preferably cylindrical in shape. A bulkhead or panel 32 is placed in the lower end of the housing 12 to form an oil reservoir 34 in the lower portion. The upper end of still housing 12 is provided with an outwardly extending annular flange 14. Mounted within still housing 12 is a closed bottom open top liner 16 which is cylindrical but of a smaller diameter than the housing 12 so as to leave an annular space 28 between the liner and the housing. The liner 16 has bottom 36. The upper end of the liner 16 is opened but is provided with an outwardly extending annular flange 18 which rests on top of housing flange 14. A suitable gasket, not shown, is provided between flanges 14 and 18. A cap or head 20 is of essentially the same diameter as still housing 12 and has an outwardly extending annular flange 22 which rests on liner flange 18 and housing flange 14. A suitable gasket, not shown, is provided between flanges 18 and 22 to provide an effective seal. The three flanges are held together by bolts 38 or other suitable means. Near the lower end of head 20 is a condensate tray 40. As can be seen when installed as shown in FIG. 1 the liner 16 and head 20 form an enclosed space. Both the head 20 and the liner 16 are supported by the wall of still housing 12 through flange 14. A dirty solvent inlet line 42 having control valve 44 is provided so that dirty solvent can be injected through inlet coupling 46 into the interior of liner 16. A level control 48 having float 50 is provided in the head 20. When the dirty solvent reaches a selected level 52 the liquid level control 48 will close the valve 44. Valve 44 is preferably a normally closed valve and is held open by control 48 until the desired level 52 is obtained. Head 20 is also provided with a vapor outlet 54 and a condensate outlet 56 and both are connected to transfer line 58 which leads to a condenser for condensing the vapors. A vent line 98 having valve 100 is provided in the wall of housing 12 just below flange 14. This is useful when heating oil is heated or added to the space between the liner 16 and the housing 12.

A waste or contaminate line 60 extends through coupling 62 in the top of head 20. The lower end of the line 60 extends nearly to the bottom 36 of liner 16. Typically this is within one-half inch of the bottom. The upper end of conduit 60 extends through coupling 62 through a valve 64 to a junction 66. One branch of the junction 66 is connected through a valve 68 to waste line 70. Another branch of junction 66 is connected through valve 72 to an air inlet line 74. Head 20 is also provided with an air inlet 76 having a valve 78. This is for providing air under pressure to the space inside the head 20.

I will now discuss the part of the apparatus useful for heating the dirty solvent. This includes a heat transfer oil zone or "heat zone" which surrounds the walls and bottom of liner 16 and includes the annular space 28 and the cylindrical space 29 which is below the bottom 36 and above the bulkhead or panel 32. An emersion heater 30 extends into space 29 and is connected through the wall of the housing 12 by coupling means 80. The heater can be set to any selected temperature. An acceptable heating oil is produced by Monsanto Products and is identified as their Therminol 55 which can normally be safely heated in the range of 200 to 550 degrees Fahrenheit. A line 82 connects inlet/outlet 84 in the bottom of space 29 with inlet/outlet 86 which is in the bottom of oil reservoir 34. A valve 88 is in this line 82. Line 82 is provided with a fill line 90 having valve 92. An air inlet 94 having valve 96 is provided in the wall of housing 12 near the top of oil reservoir 34. An air supply, not shown in FIGURE 1 is provided under pressure.

Attention will now be directed briefly to a description of the apparatus of FIG. 1 or recovering clean solvent from dirty solvent. In operation the apparatus is assembled essentially as shown in FIG. 1. Dirty solvent is injected through valve 44 and line 42 into the interior of head 20 where it falls into liner 16. When the dirty solvent reaches a selected level 52 level control 48 shuts valve 44. Air under pressure from a source not shown in FIG. 1 is injected through valve 96 in line 94 into the top of oil reservoir 34. This forces heating oil out outlet 86 through line 82, valve 88 and inlet 84 into the heat transfer oil zone which includes reservoir space 28 and 29. Valve 92 is normally be closed and valve 88 is open during this loading operation. Vent valve 100 is open so that air may escape from the top of the space between liner 16 and housing 12 as heating oil is loaded into the oil zone. Heating transfer oil is transferred from oil reservoir 34 into the still housing until the level is just below the vent 98. At this time valve 88, in the heating oil supply line is closed. Valve 44 in the dirty solvent inlet line is closed, air inlet valve 78 is closed as is valve 64. The heating oil now is heated to the desired tempeature which typically may be between 200 and 550 degrees Fahrenheit. During this time, vent valve 100 is opened so as to prevent the buildup of pressure on the heating oil. As the heating oil expands from heating it will overfow back down to the oil reservoir. As the dirty solvent becomes heated the solvent vaporizes and the vapors go out outlet 54 to line 58 which leads to a condenser (not shown in FIG. 1). There will be some condensation within head 20 along the vertical wall and this condensation will be collected in condensate tray 40. The fluid in condensate tray 40 is also connected to line 58 and will be connectetd to the condenser recovery. When essentially all of the solvent is driven out of the "dirty solvent" valve 59 in line 58 is closed, air valve 78 is opened and air under pressure is injected through line 76 and forces the dirty contaminates in liner 16 out line 60. At this time valves 64 and 68 are opened and valve 72 is closed. The dirty solvent is then driven out through line 70 to a container not shown in FIG. 1. Occasionally, inlet at the bottom of waste line 60 is clogged. If this is the case, then valve 68 is closed and valve 72 is opened and air under pressure from a source not shown in FIG. 1 is injected therein through the line 60 so as to clear the line 60 in the bottom inlet thereto.

During the time that the dirty contaminant is being removed valve 88 is opened so that heating transfer oil can be removed from the interior of the housing 12 and permitted to flow by gravity to oil reservoir 34. As will be seen this is an important step. Once all of the dirty solvent that can be removed by air pressure has been accomplished, head 20 is then removed by removing bolt 68. This is after the heating oil has been removed from the oil heating zone. At this time if I had not removed the heating oil from the housing 12 the liner 16 would float up and out of posiiton just like a boat. However, inasmuch as I have removed the heating oil, the liner 16 will stay in the proper position. By disconnecting the lines at couplings, not shown, a crane, also not shown is connected to hook 27 and the head 20 is removed. At this time, any dirt remaining in the liner 16 can be removed with shovels or the like so that the liner is cleaned. If the liner requires extensive cleaning the liner can be lifted out and a clean liner reinstalled. When the liner is thus cleaned or replaced the head 20 is reassembled and flange 22 is again connected to flanges 18 and 14. At this time I am ready for another batch of dirty solvents to be flowed into the liner 16 for recovering the solvent from the dirty solvent. This still apparatus shown in FIG. 1 is portable and is preferably mounted on a trailer so that it can be moved from site to site. When on the site it cleans the dirty solvent to recover the clean solvent. The contaminants which are obtained are stored in containers at the site or they can at any time be properly and legally disposed of. The still of FIG. 1 then can be transported down the highway without problems because it contains no hazardous material.

Figure 2A:
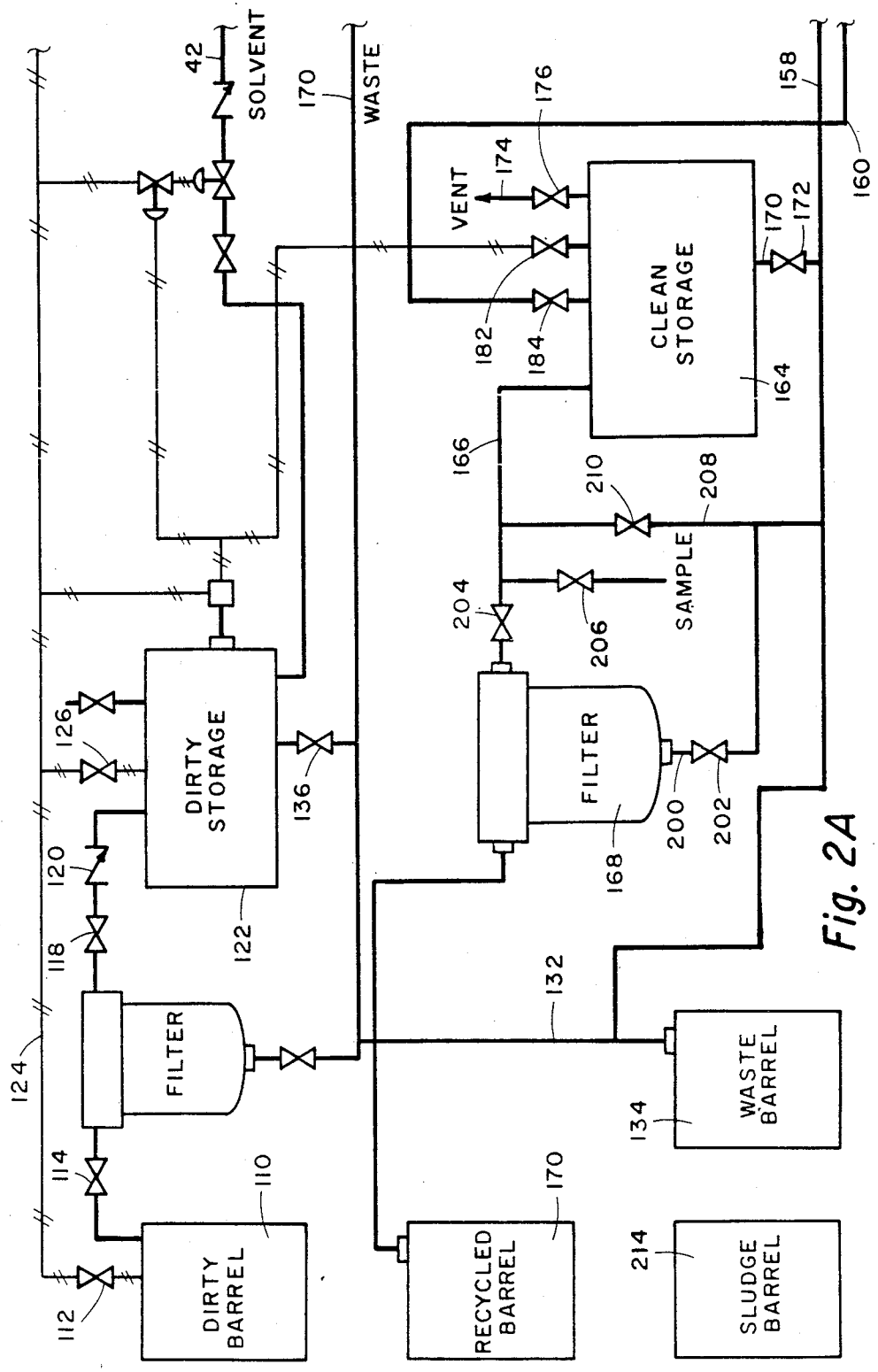

Attention is now directed to FIGS. 2A and 2B which show a simplified flow diagram of the entire solvent cleaning system. The heart of the system is my still 10. I will first discuss that portion of the flow diagram which has to do with cleaning the contaminated solvent. Shown thereon is a dirty barrel 110 in which the contaminated or dirty solvent is stored on site by the operator using the solvent in its cleaning business. An air pressure line is provided through valve 112 to the barrel so that it can force the dirty solvent through valve 114 to filter 116. The outlet goes to a valve 118 and check valve 120 to dirty storage tank 122. Air from supply line 124 flows through valve 126 to force the dirty solvent through normally closed valve 40 into the still. The still and its operations were described above in relation to FIG. 1. Waste from filter 116 is fed through valve 128 to line 130 which connects to main wasteline 132 which goes to a waste barrel or container 134. Waste may be drained from dirty storage container 122 through valve 136 to line 130 and 132 on into the waste barrel 134. The waste outline 70 from the still is also fed through line 132 to the waste barrel 134.

Line 58 carries solvent vapors and condensate from still 10 to condenser 138 which has a blower motor 140 connected to electrical source 142. Heater 30 is also connected to source 142. The liquid solvent leaves condenser 138 through lines 144 through valve 146 and check valve 148 to a water separator 150. A sampling valve 152 is provided so the samples can be taken from line 144. The water from water separator 150 is drained off the bottom through line 154 and valve 156 to waste line 158 which leads to waste barrel 134 which is a container of adequate volume. Of course, when waste barrel 134 is filled another container is tied in. The solvent is removed from water separator 150 through line 160 with valve 162 to clean storage 164. This has clean solvent outlet 166 which goes through filter 168 to recycle barrel 170 in which the clean solvent is stored and is then available for reuse. Clean storage container 164 has a sump outlet 170 with valve 172 which is connected into waste line 158. Also connected to clean storage tank 164 is vent line 174 with valve 176. This connects into the vent line 178. Air supply line 178 is connected through lateral lines 180 through valve 182 to clean storage container 164 by closing valve 176 and 184 and in opening valve 182 air pressure will cause the clean solvent in container 164 to flow through line 166 and filter 168 to the recycle barrel 170. Filter 168 has a sump outlet 200 with valve 202 which connects to the waste line 158 for connecting to the waste barrel 154. An upstream valve 204 is also provided in line 166 for filter 168 and a sample valve 206 is provided for sampling the fluid in line 166 just before it reaches the filter 168. A cross line 208 with valve 210 is also provided to connect the outlet cleaning solvent line 166 with the waste line 158. This is a very fine system in that all recycling of the solvent is done on site and there is no need to carry any hazadous waste in making this cleaning. The industry in which this system would be used may store their dirty or waste solvent in containers such as dirty barrel 110 and when sufficient quantities of dirty solvents was accumulated then the operator of the recovery system would be called in and he would bring in the equipment shown in FIGS. 2A and 2B except for the dirty barrel and the recycle barrel and the waste barrel. Then on site the dirty solvent from the dirty barrel 110 would be cleaned up and stored in recycle barrel 170. The waste from the still would be stored in waste barrel 154 and the sludge in a barrel 214. That is the sludge that was shoveled out of liner 16. It is normally quite some time before the waste barrel 134 and sludge barrel 214 are filled and would need emptying. When this occurs the operator of the industry for which the solvent was being cleaned would then call a qualified hazardous product disposer.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An apparatus for obtaining clean solvent from dirty solvent which comprises:
    a cylindrical housing having an open top, a first bottom enclosing the lower end of said housing, and a second bottom spaced above said first bottom to form an oil reservoir in the lower end of said housing;
    an outwardly extending first annular flange fixed to the top of said housing;
    a cylindrical liner positioned inside the cylindrical housing and having a smaller outside diameter than the inside diameter of said cylindrical housing and having a closed bottom, said bottom of said liner being spaced from said second bottom, and said liner being positioned inside said housing so as to provide a spacing therein and an open upper bottom;
    an outwardly extending second annular flange fixed to the top of said liner and fitting on said first annular flange;
    a cylindrical head of approximately the same diameter as the diameter of said cylindrical housing and having a closed top and an open bottom and positioned on top of the housing so that its open bottom is adjacent to the open top of the housing;
    an outwardly extending third annular flange fixed to the bottom of said head and fitting on said second annular flange;
    means to hold said first, second and third annular flanges together;
    a vent in the wall of said cylindrical housing adjacent said first annular flange;
    heating oil in said oil reservoir;
    heating means in said spacing between said liner and said housing;
    means to inject dirty solvent into said liner;
    means to recover any vapor from the interior of said head;
    means to control the level of dirty solvent in said liner;
    means to transfer said heating oil between said oil reservoir and said spacing;
    a contaminant removal line extending through said head to near the bottom of said liner;
    means to supply air under pressure to said liner to drive said contaminants out said contaminant line.

2. An apparatus as defined in claim 1 including a hook at the top of said head so that it may be lifted off the second annular flange and wherein said means to transfer oil includes a first port in said housing and a second port in said oil reservoir and a line connecting the two ports with a valve there between and an air inlet with valve connected to the upper part of said oil reservoir for driving oil out through the second port;
    a condensate tray in said head and secured to the wall thereof.

* * * * *